July 23, 1963

H. HVAM

Re. 25,425

TOE HOLDING DEVICE FOR SKIS

Original Filed May 9, 1960

INVENTOR.

HJALMAR HVAM

BY

Buckhorn, Cheatham & Blore

ATTORNEYS

Re. 25,425

United States Patent Office

Reissued July 23, 1963

25,425

TOE HOLDING DEVICE FOR SKIS

Hjalmar Hvam, Rte. 1, Box 404, Beaverton, Oreg.

Original No. 2,994,543, dated Aug. 1, 1961, Ser. No. 27,811, May 9, 1960. Application for reissue May 7, 1962, Ser. No. 193,372

12 Claims. (Cl. 280—11.35)

Matter enclosed in heavy brackets [ ] appears in the original patent but forms no part of this reissue specification; matter printed in italics indicates the additions made by reissue.

My present invention comprises a toe holding device for a ski, the invention being of utility in ski bindings of the type which release the ski from the skier in the event of strains of a nature which might cause injury. Such ski bindings usually comprise a spring or other means for forcing the toe of the foot against a toepiece. The present invention is of utility in a toe holding device comprising a vertically pivoted strain-release means which permits the toe of the boot to move laterally into a releasing position when a lateral strain beyond safe limits occurs.

An object of the present invention is to provide means for holding the toe of the boot in normal position regardless of the style of the toe or the thickness of the sole of the toe.

A further object of the present invention is to provide means of the foregoing character which may be easily operated to hold the toe in position, which is made of relatively few, simple, rugged parts which are easily manufactured and assembled.

The purposes and objects of the present invention will be more readily understood by reference to the following specification taken in connection with the accompanying drawings wherein like numerals refer to like parts throughout.

Figure 1:
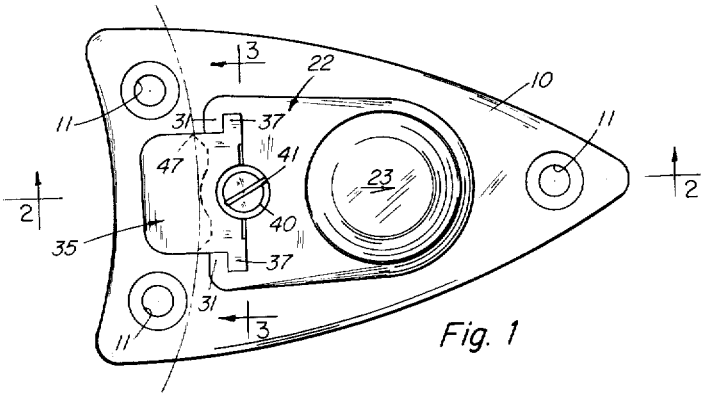
FIG. 1 is a plan view of the present invention.
Figure 3:
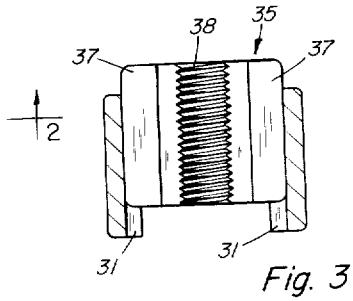
FIG. 3 is a vertical section taken substantially along line 3—3 of FIG. 1.
Figure 4:
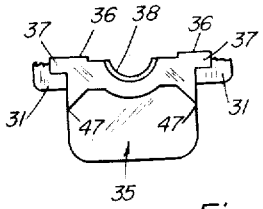
FIG. 4 is a bottom view of FIG. 3.
Figure 2:
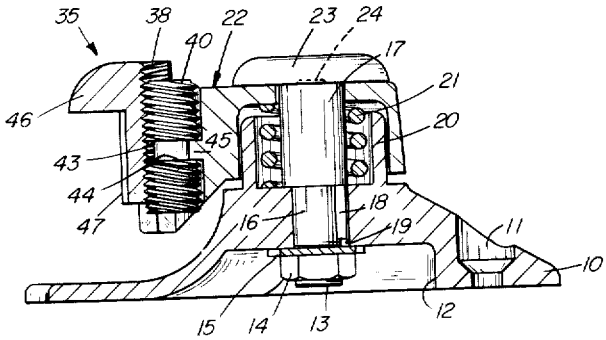
FIG. 2 is a vertical section taken substantially along line 2—2 of FIG. 1.
Figure 6:
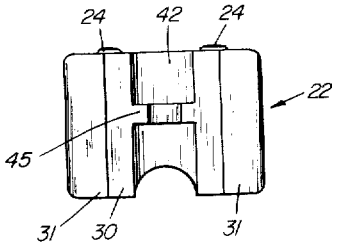
FIG. 6 is an end view of FIG. 5.
Figure 5:
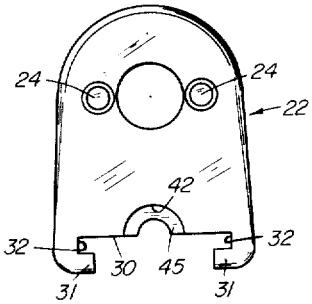
FIG. 5 is a plan view of a part of the invention.

The toe holding device comprises a base 10 having a planar, peripheral, lower surface adapted to engage the upper surface of a ski to which it is attached by means of screws passing through screw-receiving openings 11. The base has a central recess 12 in which there is positioned the threaded lower end of a vertically extending pivot bolt 13, a nut 14 threaded thereon, and a lock washer 15. The bolt has a lower portion 16 of small diameter and an upper portion 17 of large diameter separated by a shoulder which bears upon an upper surface of the base and provides means for clamping the bolt in position. The reduced portion 16 is keyed to the base by a key 18 projecting from the bolt into a slot 19 in the base. The larger portion 17 of the bolt is surrounded by a spring-retainer wall 20 rising from the upper surface of the base, in which there is retained a strain-release spring 21 held under compression. The upper end of the spring bears against a lower surface of a toe holding device arm 22, the upper surface of which is urged by the spring against the large flat head 23 of the bolt. The upper surface of the arm 22 is provided with a plurality of rounded projections 24 which project into complementary recesses in the lower surface of the bolt head 23, as indicated in FIG. 2, when the arm is in boot-holding position, that is to say projecting rearwardly over the base in the direction of the length of the ski. The construction thus far described provides a vertically pivoted strain-release means mounted on the base for retaining the toe holding device arm in its position of use under normal conditions, and which yields to permit pivotal movement of the toe holding device arm in either direction so as to release the boot when danger to the skier threatens.

The free end of the toe holding device arm 22 is provided with a vertical guideway on the end surface 30 thereof, the same being provided by a pair of inwardly facing, laterally spaced flanges 31 each defining a vertical groove 32. The surface 30, flanges 31 and grooves 32 constitute a guideway formed on the end of the toe holding device arm.

The guideway slideably guides a toe holding jaw 35 which is provided with surface portions 36 which slide against the end surface 30 and a pair of laterally projecting tongues 37 which are engaged in the grooves 32. Between the surfaces 36 the toe holding jaw is provided with a recess 38 which is threaded to define a half-nut surface. A toe holding jaw adjusting screw 40 provided with a transverse driving slot 41 in its upper end is engaged with the half-nut threads. The remainder of the screw projects into a recess 42 in the end surface 30 of the toe holding device arm. The screw is provided with an intermediate, non-threaded portion 43 of reduced diameter which provides an annular groove 44 in the body of the screw, and an annular flange 45 in the recess 42 is engaged in the groove 44 to prevent longitudinal movement of the screw while permitting its rotation. When the screw is rotated in one direction a flange 46 at the top of the jaw is drawn down toward the upper surface of the toe portion of the sole of a thin soled ski boot, and thicker soled ski boots may be accommodated when the screw is rotated in the opposite direction. The rearwardly facing surface of the jaw is provided with a pair of sharp, vertically extending ridges 47 which are adapted to engage the end surface of the toe of the ski boot, the ski boot being forced thereagainst by the usual spring ski binding or other means. The toe is therefore releasably held in normal position.

From the foregoing it can be seen that the ski boot toe is held in proper position under normal strains, but that if a dangerous strain should be exerted such as might cause the skier's leg to be broken, the toe holding device arm will swing laterally in either direction, permitting the ski to release itself from the skier.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A toe holding device for a ski comprising a base adapted to be mounted on the upper surface of a ski, vertical pivot means mounted on said base, a toe holding device arm pivotally mounted on said pivot means and having a free end, strain-release means normally holding said toe holding device arm in fixed relation to said pivot means, said free end having a vertical guideway formed thereon, a toe holding jaw slideably engaged with said guideway for vertical movement with respect to said toe holding device arm, a toe holding jaw adjusting screw vertically positioned between said arm and said jaw, said jaw and said arm having contiguous surfaces, in one of which there is a half-nut surface threadedly engaging a portion of said screw, and in the other of which there is a recess surrounding the remainder of said screw, said screw having a non-threaded portion, and means formed on the other of said surfaces and engaging said non-threaded portion for preventing longitudinal movement of said screw.

2. A toe holding device for a ski comprising a base adapted to be mounted on the upper surface of a ski, a vertical pivot mounted on said base, a toe holding device arm pivotally mounted on said pivot and having a free end, complementary projection and recess portions on said pivot and arm normally interfitting to hold said arm in toe holding position, resilient means normally holding said portions in interfitting relation to each other and yieldable to permit their separation, said free end having a vertical guideway formed thereon, a toe holding jaw slideably engaged with said guideway for vertical movement with respect to said toe holding device arm, a toe holding jaw adjusting screw vertically positioned between said arm and said jaw, said jaw and said arm having opposed recesses therein, one of said recesses being of half-nut configuration threadedly engaging said screw, and the other of said recesses being of larger diameter than said screw, said screw having an intermediate, non-threaded portion of reduced diameter defining an annular groove, and a projection in said other recess engaged in said annular groove for preventing longitudinal movement of said screw.

3. A toe holding device for a ski comprising a base adapted to be mounted on the upper surface of a ski, vertical, vertically pivoted strain-release means mounted on said base, a toe holding device arm pivotally mounted on said strain-release means and having a free end, said free end having a vertical guideway formed thereon, a toe holding jaw slideably engaged with said guideway for vertical movement with respect to said toe holding device arm, and a toe holding jaw adjusting screw vertically positioned between said arm and said jaw, said jaw having a threaded half-nut surface threadedly engaging said screw, said screw having a longitudinally intermediate portion of reduced diameter defining an annular groove and said arm having means thereon engaged within said groove to prevent longitudinal movement of said screw when rotated.

4. A toe holding device for a ski comprising a base adapted to be mounted on the upper surface of a ski, a vertical pivot extending upwardly from said base on the longitudinal centerline thereof, a toe holding device arm member pivotally mounted on said pivot and having a free end projecting rearwardly therefrom in overhanging relation to the rear portion of said base, a toe holding jaw member mounted on said arm, one of said members having a laterally spaced pair of vertical, transversely facing grooves formed therein and the other of said members having vertical edge portions respectively engaged in said grooves whereby said jaw member is guided for vertical movement with respect to said arm member, said jaw member being provided with a pair of vertically extending, laterally spaced sharp edges adapted to engage the end surface of the toe of a ski boot, a jaw member adjusting screw vertically positioned at the free end of said arm member, means on said arm member engaging said screw for preventing longitudinal movement thereof while permitting rotation of said screw, and means threadedly engaging said screw for causing vertical adjustment of said jaw member.

5. A toe holding device for a ski comprising a base adapted to be mounted on the upper surface of a ski, vertical pivot means mounted on said base, a toe holding device arm portion pivotally mounted on said pivot means and having a free end, a toe holding jaw portion mounted on said arm portion, one of said portions having a laterally spaced pair of transversely facing, vertical grooves formed therein and the other of said portions having vertical edge portions respectively engaged in said grooves whereby said jaw portion is guided for vertical movement with respect to said arm portion, an adjusting screw vertically positioned between said arm and jaw portions, said screw being mounted on one of said portions and restrained against vertical movement relative thereto, the other of said portions having threaded means operatively associated therewith cooperatively engaging the threads on said screw for effecting vertical movement of said jaw portion upon rotation of said screw.

*6. A toe-holding device for a ski comprising a base adapted to be mounted on the upper surface of a ski,*

*a vertical pivot extending upwardly from said base on the longitudinal centerline thereof,*

*a toe-holding device arm member pivotally mounted on said pivot and having a free end in overhanging relation to said base,*

*means yieldably retaining said arm member projecting rearwardly from said pivot with its longitudinal axis aligned with said longitudinal centerline,*

*a toe-holding jaw member adjustably mounted on the free end of said arm member for vertical adjustment with respect thereto,*

*a jaw member adjusting screw vertically positioned at the free end of said arm member,*

*interengaging means on said arm member and said screw for preventing longitudinal movement of said screw while permitting rotation thereof, and*

*means on said jaw member threadedly engaging said screw for causing vertical adjustment of said jaw member upon rotation of said screw,*

*said jaw member being formed to engage the toe of a ski boot outwardly from said longitudinal axis on both sides thereof, and*

*said jaw member and said arm member having contiguous keying surfaces for preventing said jaw member from pivoting laterally with respect to said arm member while permitting said vertical adjustment.*

*7. A toe-holding device for a ski comprising a base adapted to be mounted in a fixed position on the upper surface of a ski,*

*a vertical pivot extending upwardly from said base on the longitudinal centerline of a ski on which the base is mounted and fixed to said base against movement relative to said base,*

*an arm member pivotally mounted on said pivot and having a free end,*

*means yieldably retaining said arm member against pivotal movement about said pivot to normally urge said arm member to a position projecting rearwardly from said pivot with the longitudinal axis of the arm member aligned with said longitudinal centerline,*

*a toe-holding jaw member,*

*and means mounting said jaw member adjustably on the free end of said arm member for vertical adjustment with respect to said arm member and including a screw having a longitudinal axis for holding said jaw member at any vertically adjusted position with respect to said arm member, and*

*said jaw member being provided with sole-end engaging portions positioned on opposite sides of the longitudinal axis of said arm member for engaging spaced portions of the end of the toe of the sole of a ski boot and also having a portion for overhanging the toe end of the sole of the ski boot to prevent upward movement of the toe end of the ski boot relative to a ski on which said base is mounted,*

*the spacing between said sole-end engaging portions being less than the spacing between said sole-end engaging portions and said pivot,*

*said jaw member and said arm member having a first pair of contiguous portions extending substantially vertically and spaced laterally outwardly from said longitudinal axis of said screw to prevent said jaw member from turning horizontally relative to said arm member in one direction,*

*said jaw member and said arm member also having a second pair of contiguous portions extending substantially vertically and spaced laterally outwardly from said longitudinal axis of said screw and laterally from said first pair of contiguous portions to prevent said jaw member from turning horizontally relative to said arm member in the direction opposite to said one direction,*

*said contiguous portions serving to permit vertical adjusting movement of said jaw member relative to said arm member.*

*8. In a toe-clamping device for a ski,*

*a pivot member,*

*base means adapted to be fixed to a ski and holding the pivot member in a fixed position extending substantially vertically over the centerline of a ski and spaced forwardly along the ski from the toe end of a sole of a ski boot to be secured to the ski,*

*longitudinally rigid toe-clamping means having an elongated body portion journaled on the pivot member,*

*said toe-clamping means also having a pair of sole-end engaging portions rigid thereon and positioned on opposite sides of the longitudinal axis of said body portion,*

*the spacing between said sole-end engaging portions being less than the spacing between said sole-end engaging portions and said pivot member,*

*said toe-clamping means also having a sole-top-engaging means adjustable vertically relative to said body portion for holding the toe portion of the sole of a ski boot against upward movement relative to the ski,*

*and overload means normally holding said rigid toe-clamping means against pivotal movement relative to said base means in a position extending directly rearwardly along the centerline of the ski from said pivot member with said sole-toe-end-engaging portions positioned on opposite sides of the centerline of the ski and permitting pivotal movement of said toe-clamping means relative to said base means when the torque between said base means and said toe-clamping means exceeds a predetermined torque.*

*9. A toe-holding device for a ski comprising a base adapted to be mounted on the upper surface of a ski,*

*a vertical pivot member fixed at its lower end to said base,*

*an arm member having a pivot portion and a free end spaced along the arm member from said pivot portion,*

*means mounting the pivot portion of said arm member on said vertical pivot member for pivotal movement about the axis of said pivotal member,*

*overload means normally holding said arm member in a normal position extending substantially directly rearwardly along the ski from said pivot member and permitting horizontal pivotal movement of said arm member relative to said base by any torque between said arm member and said base member greater than a predetermined torque,*

*means preventing vertical movement of said arm member relative to said base beyond a predetermined height above the ski,*

*a toe-engaging jaw member having a pair of horizontally spaced portions for engaging the toe end of the sole of a ski boot at opposite sides of the longitudinal axis of said arm member and also having an overhanging portion adapted to extend over the toe end and hold the toe end against upward movement relative to said base,*

*the spacing between said sole-end engaging portions being less than the spacing between said portions and said pivot member,*

*and holding means mounting said jaw member on said free end of said arm member and holding said jaw member against horizontal pivotal movement relative to said arm member,*

*said holding means also including manually adjustable means for holding said jaw member at any selected vertically adjusted position relative to said arm member.*

*10. In a toe-holding clamp for a ski,*

*an elongated, substantially horizontal, rigid arm having a pivotal portion centered on a substantially vertical,*

*transverse axis normal to the longitudinal axis of said arm,*

*said arm also including a free end portion,*

*jaw means having a lip portion for pressing against the top of the toe end of a sole of a ski boot and also provided with a pair of sharp ridge portions laterally spaced from each other and extending generally transversely to said lip portion,*

*means mounting said jaw means on said free end portion of said arm in a position thereon such that said sharp ridge portions are in positions equidistant from said longitudinal axis on opposite sides thereof for engaging the toe end of the sole of the ski boot,*

*said means mounting said jaw means serving to hold said lip portion against upward movement relative to said arm,*

*base means adapted to be fixed to a ski to which said ski boot is to be secured,*

*pivot means fixed to said base means and mounting said pivotal portion of said arm pivotally horizontally on said substantially vertical axis on the longitudinal centerline of said ski and also mounting said arm for vertical downward movement of said free end portion of said arm from a predetermined upper limit of said arm,*

*detent means connecting said arm to said base means to normally hold said arm in a position extending directly rearwardly from said transverse axis and above and generally parallel to the centerline of said ski and serving to so cam said arm as to move said arm downwardly a predetermined distance from said upper limit toward said ski when said toe-holding means is pivoted horizontally from said position during at least the initial portion of the pivotal movement of said arm from said position,*

*and means for effecting vertical adjustment of said lip portion relative to said arm to vary the upper limit of said lip portion.*

*11. In a toe-holding device for a ski,*

*a base adapted to be secured to a ski,*

*elongated rigid toe-holding arm means having a pivot portion and a free end portion spaced along said arm means from said pivot portion,*

*vertical pivot means secured to said base in a position extending substantially vertically upwardly from said base along a fixed axis directly over the centerline of a ski to which said base is secured and mounting said pivot portion of said arm means pivotally horizontally on said axis and slidable vertically along said axis between predetermined limits,*

*a pair of spaced tooth means rigid on the end of said free end portion for engaging the front end of the sole of a ski boot and spaced equal distances from the longitudinal axis of said arm means and on opposite sides thereof,*

*overhanging lip means for engaging the top of the toe end of the sole of a ski boot engaged by said tooth means,*

*means mounting said overhanging lip means on said free end portion of said arm means for vertical adjustment relative to said arm means, whereby selected downward forces may be applied to the top of the toe end of the sole and the sole normally presses said lip means upwardly to press said arm means upwardly along said axis to the upper limit of said predetermined limits,*

*and detent means on said base means operable when said arm means is in a position at said upper limit to hold said arm means in a position in which said longitudinal axis of said arm means extends along the centerline of said ski,*

*said detent means being adapted to force said arm means downwardly along said fixed axis when said arm means is pivoted horizontally from said position.*

*12. In a toe-holding clamp for a ski,*

*jaw means having a pair of horizontally spaced, generally vertically extending ridges for engaging the toe end of a sole of a ski boot and also having a vertically adjustable lip member for engaging the top of the toe end portion of the sole of the ski boot,*

*pivot means extending substantially vertically and held on the ski,*

*means mounting said jaw means pivotally on said pivot means,*

*and detent means normally holding said jaw means in a position extending generally rearwardly along the ski and including camming means causing downward movement of said lip member before permitting said jaw member to be moved substantially from said position.*

References Cited in the file of this patent or the original patent

UNITED STATES PATENTS

| | | |
|---|---|---|
| 2,383,064 | Lanz | Aug. 21, 1945 |
| 2,846,232 | Schnell | Aug. 5, 1958 |
| 2,867,446 | Rehacek | Jan. 6, 1959 |
| 2,899,210 | Marker | Aug. 11, 1959 |
| 3,009,710 | Marker | Nov. 21, 1961 |

FOREIGN PATENTS

| | | |
|---|---|---|
| 1,137,121 | France | Jan. 7, 1957 |
| 54,663 | Norway | Nov. 19, 1934 |